United States Patent [19]

Jamieson et al.

[11] Patent Number: 5,631,452
[45] Date of Patent: May 20, 1997

[54] SYSTEM FOR POSITION LOSS RECOVERY FOR AN ELEVATOR CAR

[75] Inventors: Eric K. Jamieson, Farmington; Christopher S. Pietrzykowski, Avon; Jeffrey M. Izard, Bolton, all of Conn.

[73] Assignee: Otis Elevator Company, Farmington, Conn.

[21] Appl. No.: 292,645

[22] Filed: Aug. 18, 1994

[51] Int. Cl.$^6$ ..................................................... B66B 3/02
[52] U.S. Cl. ........................................... 187/394; 187/391
[58] Field of Search ................................... 187/391, 394, 187/393

[56] References Cited

U.S. PATENT DOCUMENTS

| | | | |
|---|---|---|---|
| 3,648,029 | 3/1972 | Ungnadner | 235/92 DN |
| 4,203,506 | 5/1980 | Richmon | 187/29 R |
| 4,245,721 | 1/1981 | Masel | 187/29 R |
| 4,346,788 | 8/1982 | Shung | 187/29 R |
| 4,362,224 | 12/1982 | Fairbrother | 187/29 R |
| 4,363,026 | 12/1982 | Salmon | 187/29 |
| 4,375,057 | 2/1983 | Weise et al. | 340/21 |
| 4,384,275 | 5/1983 | Masel et al. | 340/347 |
| 4,627,518 | 12/1986 | Meguerdichian | 187/29 R |
| 4,750,592 | 6/1988 | Watt | 187/134 |
| 5,153,390 | 10/1992 | Barkman et al. | 187/134 |
| 5,274,203 | 12/1993 | Skalski et al. | 187/134 |
| 5,306,882 | 4/1994 | Gerwig et al. | 187/134 |

*Primary Examiner*—Robert Nappi
*Attorney, Agent, or Firm*—Francis J. Maguire

[57] ABSTRACT

A system for position loss recovery for an elevator car includes a plurality of pairs of encoded floor magnets that uniquely identify each floor. Upon restoration of power, the encoded floor magnets are sensed by an encoded floor sensor and the precise floor location of the elevator car is determined.

21 Claims, 5 Drawing Sheets

SYSTEM FOR POSITION LOSS RECOVERY FOR AN ELEVATOR CAR

BACKGROUND OF THE INVENTION

1. Field of the Invention

The present invention generally relates to elevators and, in particular, relates to a system for position loss recovery for an elevator car.

2. Description of the Prior Art

In many elevator applications, the absolute position, i.e. location, of the elevator car is determined by use of a machine mounted primary position transducer. Generally, in one typical arrangement, the primary position transducer generates pulses in relation to the distance moved by the elevator car within the hoistway. The pulses are counted relative to an initialization hoistway switch which is typically located at one end of the hoistway, for example, the bottom of the hoistway. Hence, at any time during operation, the location of the elevator can be accurately determined by performing what is generally referred to as a terminal position recovery run. In a terminal position recovery run, the elevator is moved to one end of the hoistway whereat the initialization switch is actuated. The position of the elevator car is thereafter known from counting the pulses produced by the primary position transducer. Such an operation compensates for elevator car position errors, such as rope creep and rope slippage.

When power is lost during operation, however, a position recovery difficulty arises because an elevator car can be required to recover its position only to the nearest landing, or floor, for example, in Fireman's Service Operation, before resuming normal operation. Consequently, a terminal position recovery run is unacceptable.

One basic approach to ensure compliance with such requirements is to maintain power to the necessary circuits and transducers during the powered down condition. Typically, these approaches require that the loss of power be detected and the instantaneous position of the elevator car be identified and stored in a non-volatile memory. Hence, when power is restored, the elevator system controller can access the non-volatile memory to precisely ascertain the current location of the elevator car.

Such approaches, in order to function with the various AC/DC drive systems, require the provision of a secondary power supply, for example, in the form of a battery or by stored capacitive energy. These components are not only expensive and bulky but, in the case of batteries, require maintenance and routine replacement. Further, capacitive energy storage devices are not only bulky but of questionable reliability.

Numerous position location sensors are known in the art. In some elevator systems, e.g., hydraulic systems, magnet assemblies are positioned in the hoistway at various points near the landings to indicate to the approaching car its positions relative to the landing, for leveling, direction, etc. In geared systems, locating vanes are mounted on a tape stretched from top to bottom of the hoistway for similar purposes. The vanes are of differing configurations to signify the differing conditions such as up/down stopping vanes, door zone vanes, floor zone vanes, etc. Both the above mentioned hydraulic and geared position indicating systems use position indicating devices in the hoistway but do not generally distinguish one floor from another. For example, U.S. Pat. No. 4,362,224, entitled Discrete Position Location Sensor, issued on Dec. 7, 1982 to Fairbrother and assigned to the assignee hereof and U.S. Pat. No. 4,346,788, entitled Tailorable Discrete Optical Sensor, issued on Aug. 31, 1982 to Shung and assigned to the assignee hereof describe discrete position sensors that include light sources and optical detectors that are interruptible by a vane. Typically, the vanes are adjustable so that the relative position of two objects can be determined.

In U.S. Pat. No. 4,375,057, entitled Position Sensor, issued on Feb. 22, 1983 to Weiss et at. and assigned to the assignee hereof, microwave signals are used to determine the position of an elevator car in a hoistway. As discussed therein, a slotted microwave waveguide is disposed within the hoistway and a waveguide shorting stub is connected to the elevator car. The waveguide shorting stub slides within the waveguide as the elevator car moves within the hoistway. Hence, by injecting microwave signals into the waveguide and measuring the reflected signal, the position of the waveguide shorting stub, and thus the elevator car, can be readily and accurately determined.

In U.S. Pat. No. 4,363,026 entitled Position Encoder Update Mechanism and Method, issued on Dec. 7, 1982 to Salmon and assigned to the assignee hereof and U.S. Pat. No. 4,384,275 entitled High Resolution And Wide Range Shaft Position Transducer Systems, issued on May 17, 1983 to Masel et al. also assigned to the assignee hereof, the transducers for determining the position of an object include a gear arrangement.

U.S. Pat. No. 4,627,518 entitled Backup Position Signaling In An Elevator, issued on Dec. 9, 1986 to Meguerdichian et at. and assigned to the assignee hereof describes an elevator car position transducer that includes a backup power supply. U.S. Pat. No. 5,274,203 also shows a battery backup along with several fail-safe features including redundancy, misindication checks, etc. It also discloses an absolute position encoder for instant floor position recovery. This last system is very effective but also expensive.

Although each of these techniques has advantages for specific applications, none provide an inexpensive, highly accurate solution to the problem of recovering the position, or location, of an elevator car to the nearest floor subsequent to a power loss. Consequently, a system for position loss recovery for an elevator car that avoids the above recited drawbacks is clearly desirable.

SUMMARY OF THE INVENTION

Accordingly, one object of the present invention is to provide a system for position loss recovery for an elevator car that overcomes the above recited drawbacks.

This object is accomplished, at least in part, by a system for position loss recovery for an elevator car that includes a plurality of pairs of encoded floor magnets.

In one aspect of the invention, each landing zone within the hoistway is provided with a pair of encoded floor magnets that are sized, or encoded, to unambiguously identify each particular landing. In one preferred embodiment, the encoded floor magnets are formed to a length that is an integer multiple of a predetermined unit length. In such an embodiment, subsequent to a loss of power, the elevator car may be moved in a default direction until reaching a landing. As the elevator car approaches the landing a sensor affixed to the elevator car detects the presence of one of the encoded floor magnets. After the sensor has passed the encoded floor magnet, the length of the encoded floor magnet is calculated and the position of the elevator car is known.

Other objects and advantages will become apparent to those skilled in the art from the following detailed description read in conjunction with the appended claims and the drawings attached hereto.

BRIEF DESCRIPTION OF THE DRAWINGS

The drawings, not drawn to scale, include.

DETAILED DESCRIPTION OF THE PREFERRED EMBODIMENT

Figure 1:
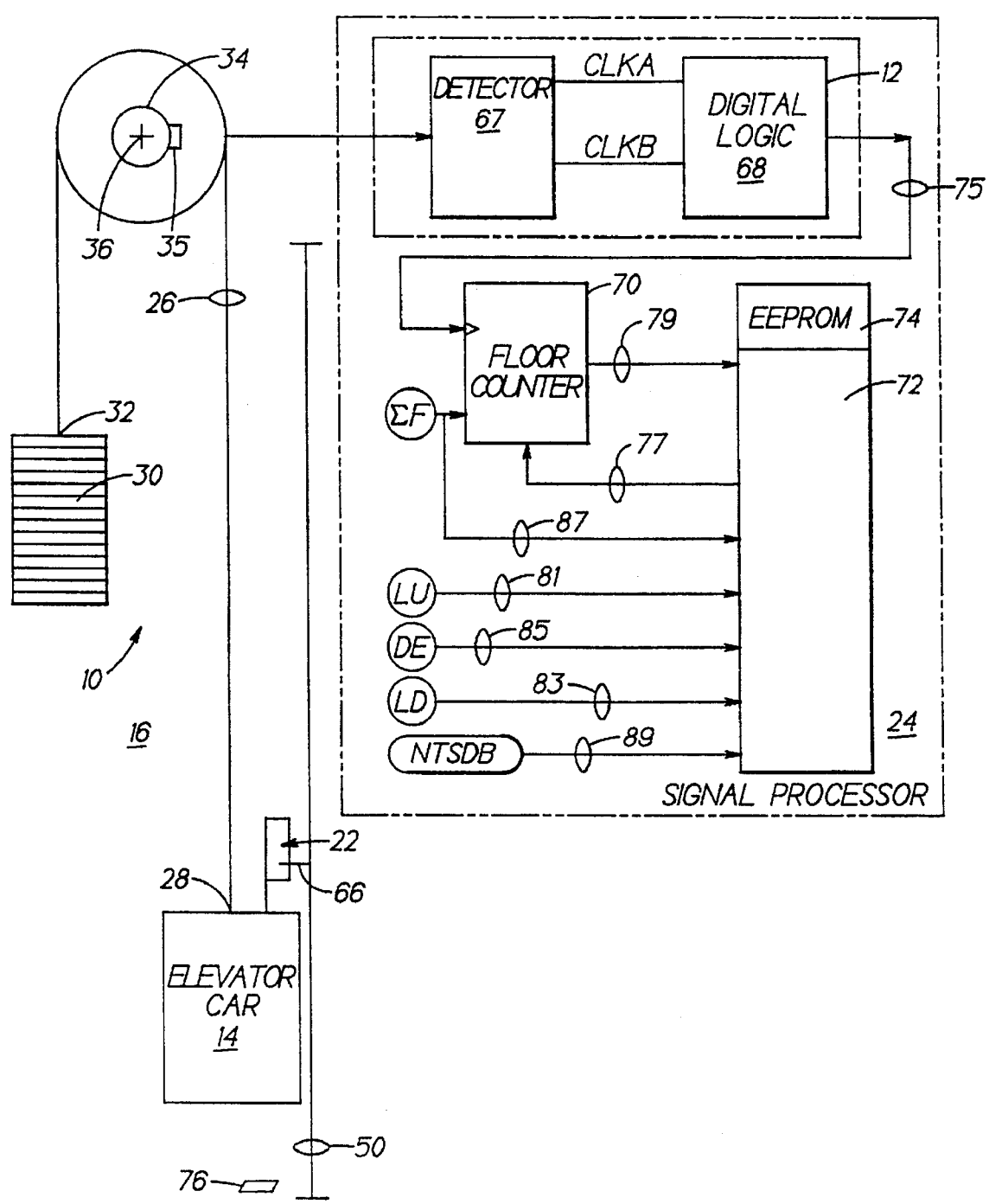
FIG. 1 which is a functional block diagram of a system for position loss recovery for an elevator car embodying the principles of the present invention.

An elevator car position loss recovery system, generally indicated at 10 in FIG. 1 and embodying the principles of the present invention, includes means 12 for generating signals indicative of the distance travelled by an elevator car 14 within a hoistway 16, means 18 (FIG. 3), disposed within the hoistway 16, for indicating each floor location, means 20 (FIG. 3) for uniquely identifying each floor location, means 22, affixed to the elevator car 14, for separately sensing the floor location means 18 and the floor identifying means 20, and means 24 for processing signals from the signal generating means 12 and signals from the sensing means 22 to determine the exact floor location of the elevator car 14.

In the exemplary embodiment shown in FIG. 1, the elevator car 14 is disposed within the hoistway 16. A cable 26 is attached to the elevator car 14 at one end 28 thereof and to a counterweight 30 at the other end 32 thereof. The cable 26 passes over a machine sheave 34 that rotates about an axis 36 to control the movement of the elevator car 14 within the hoistway 16. In the preferred embodiment, the means 12 for generating signals indicative of the distance travelled by the elevator car 14 is mounted in conjunction with the machine sheave 34 assembly. Of course, it should be realized that the present invention can be used with other elevator systems including hydraulic and linear motor systems, among others.

Preferably, the means 12 for generating signal includes a conventional primary position transducer 35 used in numerous elevator systems to provide signals that can be translated into not only distance travelled information but can also be used to determine the speed and direction of the elevator car 14.

Figure 2A:
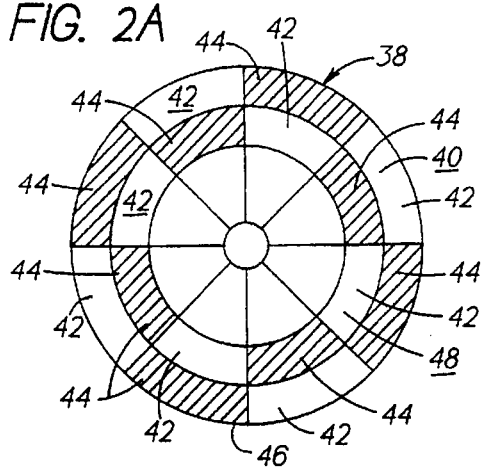
FIGS. 2A, 2B, 2C are functional diagrams of an incremental encoder having offset tracks and which is particularly useful in conjunction with the system shown in FIG. 1.
Figure 2B:
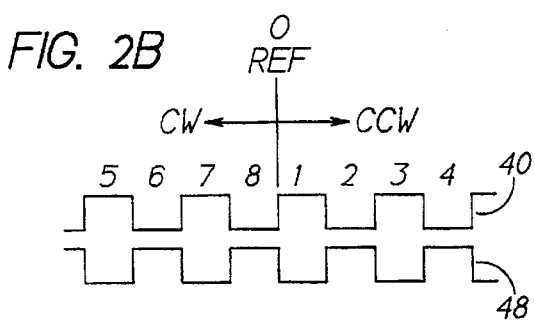
Figure 2C:
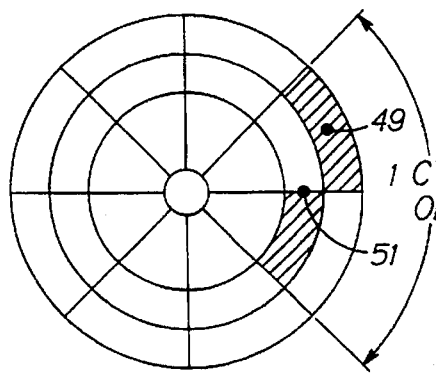

In one particular embodiment, the primary position transducer 35 includes an optical encoder disk 38, as shown in FIG. 2A, mounted coaxially with the axis 36 of the machine sheave 34. In this embodiment, the optical encoder disk 38 includes an outer track 40 of equally sized openings 42 spaced apart by equally sized masked regions 44. The openings 42 and the masked regions 44 are equal to each other in angular are and are spaced about the periphery 46 of the optical encoder disk 38. As well known in the optical encoder field, at least one light source and at least one light detector, not shown in FIG. 2A, are disposed on opposite sides of the optical encoded disk 38. Electrical pulses are produced by the light detector when the optical encoder disk 38 rotates through and chops the light beam from the light source. By counting the number of pulses generated, the amount of rotation of the optical encoder disk 38 is determined. The amount of rotation of the optical encoder disk 38 can then be readily converted to accurately determine the linear distance travelled by the elevator car 14. Further, the rate at which the generated signals are received can be used to determine the speed of the elevator car 14. Still further, the optical encoded disk 38 can be provided with an inner track 48 of alternating openings 42 and masked regions 44. However, in this embodiment, the inner track 48 is offset from the outer track 40 as shown in FIGS. 2A and 2C. Hence, by examining the pulses, shown in FIG. 2B from the tracks, 40 and 48, it can be seen that if pulses on the outer track 40 rise and fall before the pulses on the inner track 48 the optical encoder disk 38 is rotating in the counterclockwise direction. If the pulses of the inner track 48 rise and fall before the pulses of the outer track 40 the optical encoder disk 38 is rotating in the clockwise direction. In order to achieve such pulses, as shown in FIG. 2C, two detectors, 49 and 51, are provided. In the embodiment shown in FIG. 2C, one of the two detectors, for example 49, is associated with the outer track 40 and the other detector 51 is associated with the inner track 48. The detectors, 49 and 51, are angularly offset from each other by about 22.5°. In this manner, the detectors, 49 and 51 will produce the waveforms shown in FIG. 2B. It will be understood that there are many arrangements and configurations for incremental optical encoders and any such arrangements can be used in conjunction with the system 10 so long as a pulsed signal indicative of the distance travelled by the elevator car 14 is available to a counter, more fully discussed herein with respect to the means 24 for processing signals.

In the embodiment shown in FIG. 1, the hoistway 16 includes therein a vertically extending tape 50, such as, for example, a steel tape having a width (W) of about 100 millimeters. The means 18 for indicating each floor location includes, in this embodiment, a plurality of conventional door zone magnets. Each door zone magnet is precisely disposed along the tape 50 within the hoistway 16 such that, during operation, the elevator car 14 stops at and is aligned with the floor, or landing, when responding to a hall call. Typically, the door zone magnets are disposed along a first edge 52 (FIG. 3) of the tape 50.

Figure 3:
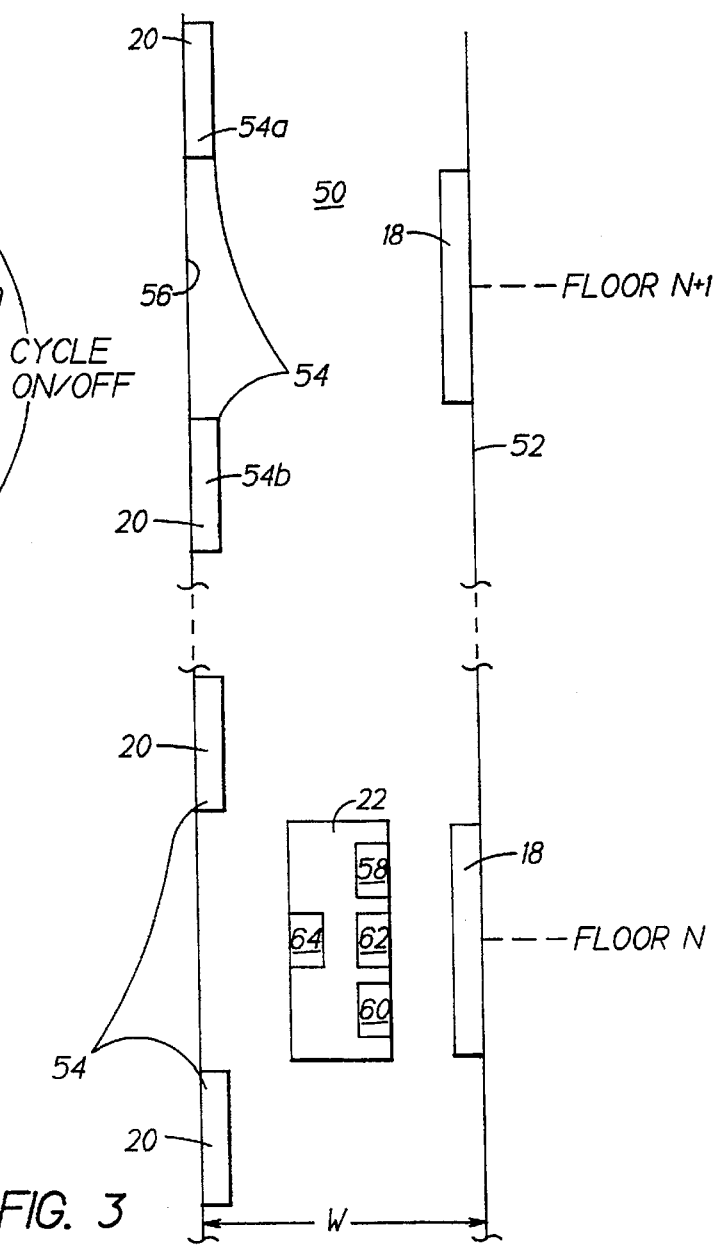
FIG. 3 is a more detailed block diagram of an arrangement of magnets and sensors according to the present invention.

As shown in FIG. 3, in the preferred embodiment according to the present invention, the means 20 for uniquely identifying each floor includes a plurality of pairs 54 of encoded floor magnets. Further, in such an embodiment, each of the plurality of pairs 54 of encoded floor magnets is disposed with members, 54a and 54b, thereof on each side of a corresponding door zone magnet 18. The position of the members, 54a and 54b, of each of the pairs 54 of encoded floor magnets is not critical so long as they are on either side of the door zone magnet. The pairs 54 of encoded floor magnets can be disposed along a second edge 56 of the tape 50.

In the preferred embodiment, each member, 54a and 54b, of each pair of the plurality of pairs of encoded floor magnets has a length that is uniquely associated with the landing number with which it is associated. In one embodiment, the length of each member, 54a and 54b, of each pair of encoded floor magnets is related by the formula: $L=(n)(UL)$; wherein L is the length of the magnet in millimeters, n is an integer representing the floor, or landing, number, and UL is the unit length of the encoded floor magnets in millimeters.

Alternatively, other means can be used to implement the means 20 for uniquely identifying each floor location. For example, the means 20 for uniquely identifying each floor location may be implemented optically. In such an optical implementation, opening having lengths that are unique to each landing could be formed in place of the pairs 54 of magnets in the second edge 56 of the tape 50 with appropriate light sources and light detectors provided on opposite sides of the tape 50. In such an embodiment, the length of each opening would be related to the floor landing by the formula set forth above.

As shown in FIG. 3, the means 22 for separately sensing the floor location means 18 and the floor identifying means 20 includes a leveling up sensor 58, a leveling down sensor 60, a door zone sensor 62 and an encoded floor sensor 64. In addition, the means 22 includes a pair of guides 66 on the sides thereof, shown in FIG. 1, that slide along the edges of the tape 50 to maintain the tape 50 in a predetermined position with respect to the sensors, 58, 60, 62, and 64. In the preferred embodiment, the leveling up sensor 58, the leveling down sensor 60 and the door zone sensor 62 are disposed proximate the first edge 52 of the tape 50 and hence, the door zone magnets. Further, the encoded floor sensor 64 is disposed proximate the second edge 56 of tape 50 and hence, proximate the plurality of pairs 54 of encoded floor magnets. Typically, the leveling up sensor 58, the leveling down sensor 60, the door zone sensor 62, and the encoded floor sensor 64 are Hall effect devices that produce an electrical output signal when placed in close proximity to a magnet. As in conventional operation, the door zone magnet, in conjunction with the leveling up sensor 58, the leveling down sensor 60 and the door zone sensor 62 are used to precisely locate the elevator car 14 with respect to the landing when stopping to load or unload passengers.

In the embodiment shown in FIG. 1, the signal processing means 24 includes a detector 67 for providing signals indicative of the distance travelled by the elevator car 14, a digital logic block 68, an encoded floor counter 70 and a microprocessor 72 having a non-volatile memory 74 associated therewith and accessible thereto. The signal processor may also include a random access memory, input/output ports and data, address and control lines (not shown).

As aforementioned, the detector 67 can be any means for providing a signal indicative of the distance travelled by the elevator car 14 in response to inputs from the primary position transducer 35 along either the CLKA or the CLKB line, depending upon the direction of the elevator car 14. Typically, the detector 67 will generate a pulsed, or digital, signal on the CLKA or CLKB lines that is processed by the digital logic block 68 to provide a clock signal on line 75 to the encoded floor counter 70. In the embodiment shown, the encoded floor counter 70 is resettable by the signal from the microprocessor 72 along the line 77. The output of the encoded floor counter 70 is inputted to the microprocessor 72 along line 79. Thus, with the encoded floor counter 70 reset to zero by a signal along line 77, after the encoded floor sensor 64 is scanned across one of the encoded floor magnets 54, the encoded floor counter 70 outputs a signal along line 79 to the microprocessor 72 representative of the total number of clock pulses received by the encoded floor counter 70 on line 75. This number of clock pulses is representative of the length of travel of the elevator car 14 while traversing the encoded floor magnet 54. As a result, the length of the encoded floor magnet 54 can be calculated by the microprocessor 72. The floor landing associated with the encoded floor magnet 54 that is traversed can then be determined by the formula: n=EFcounts/(SF*UL); wherein EFcounts is the number of clock signals counted from the encoded floor counter 70, and SF is the primary position counts/millimeter scale factor which is predetermined and stored in the non-volatile memory 74 of the microprocessor 72 and UL is, as before, the unit length of the encoded floor magnets in millimeters.

As shown in FIG. 1, the microprocessor 72 receives signals directly from the leveling up (LU) sensor 58 on line 81, the leveling down (LD) sensor 60 on line 83, the door zone (DZ) sensor 62 on line 85, the encoded floor (EF) sensor 64 on line 87 and an initialization (NTSCB) switch 76 on line 89. Preferably, the initialization switch 76 is disposed at one end of the hoistway 16 as shown in FIG. 1 just above the elevator pit. The microprocessor 72 uses these signals in accordance with a preprogrammed software program, one embodiment of which is represented in the flow diagram of FIGS. 4A–4C and more fully discussed below, to accurately determine the location of the elevator car 14 within the hoistway 16.

Referring to FIGS. 1, 3, 4A, 4B and 4C, upon restoration of power the software program is entered at a step 78, steps will then be executed to cause the elevator car 14 to move in either the up or down direction. Typically, however, the default direction is the down direction. As indicated at a decision step 80, the microprocessor 72 samples the NTSDB input to determine whether or not the initialization switch 76 is active, i.e., indicating that the elevator car 14 is at the bottom of the hoistway 16, i.e., the pit. If the initialization switch 76 is active, then the elevator car 14 is initialized in the conventional manner, as indicated in a step 82, to correct for rope slip or rope creep errors and the program is exited as indicated in a step 91.

Figure 4A:
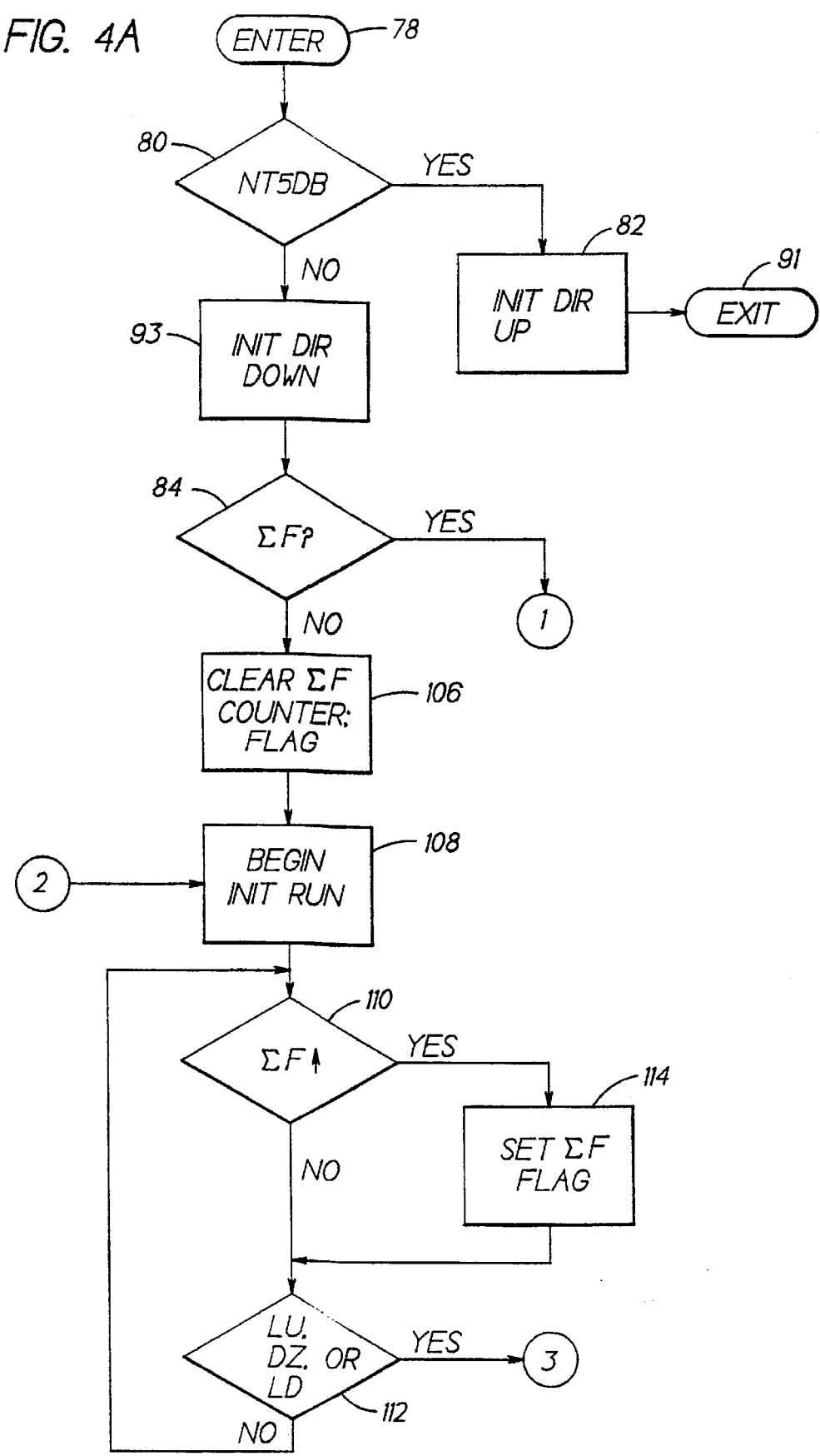
FIGS. 4A, 4B and 4C depict a flow chart of a software program for determining the position of an elevator car according to the present invention.

If the elevator car 14 is not at the bottom of the hoistway 16, i.e., the initialization switch 76 is inactive and the down direction is initialized in a step 93. Then, in a step 84, the microprocessor 72 samples the EF signal on line 87, i.e., the encoded floor sensor input, to determine whether or not the encoded floor sensor 64 is in proximity to any encoded floor magnet 54. If the encoded floor sensor 64 is proximate to any encoded floor magnet 54 then the elevator car 14 must be moved off of the encoded floor magnet 54 in the down direction and the software program branches to Branch 1, shown in FIG. 4C. Upon entering Branch 1, a low speed initialization run is commenced, as indicated at step 86, and the encoded floor (EF) sensor 64 is sampled, as indicated in a step 88, by the microprocessor 72 to determine when the elevator car 14 has moved past the encoded floor magnet 54. When the encoded floor magnet 54 is no longer sensed, i.e., when the elevator car 14 has moved away from the encoded floor magnet 54, after repeated executions of the step 88 the encoded floor counter 70 is cleared by means of a counter clear signal from the microprocessor 72 on the line 77, as indicated in a step 90, and the program moves to a step 108 as shown in FIG. 4A and the initialization run continues. If the encoded floor sensor 64 is not proximate any encoded floor magnet 54 as determined in the step 84, the program does not switch to Branch 1 then the encoded floor counter 70 is cleared, as indicated in a step 106, by the microprocessor 72 and a low speed initialization run is commenced directly according to the step 108.

If the elevator car 14 has been moved off of one of the encoded floor magnets 54 then the elevator car 14 is now either just above the landing and below the encoded floor magnet 54a or the elevator car 14 is below the encoded floor magnet 54b. If the elevator car 14 is above the landing and below the encoded floor magnet 54a, the decision step 112 will answer "YES" before the decision step 110 answers "YES". In this case, the program will branch to Branch 2, shown in FIG. 4B, with the encoded floor flag in the microprocessor 72 not yet set. This results in the program branching into block 92.

Figure 4B:
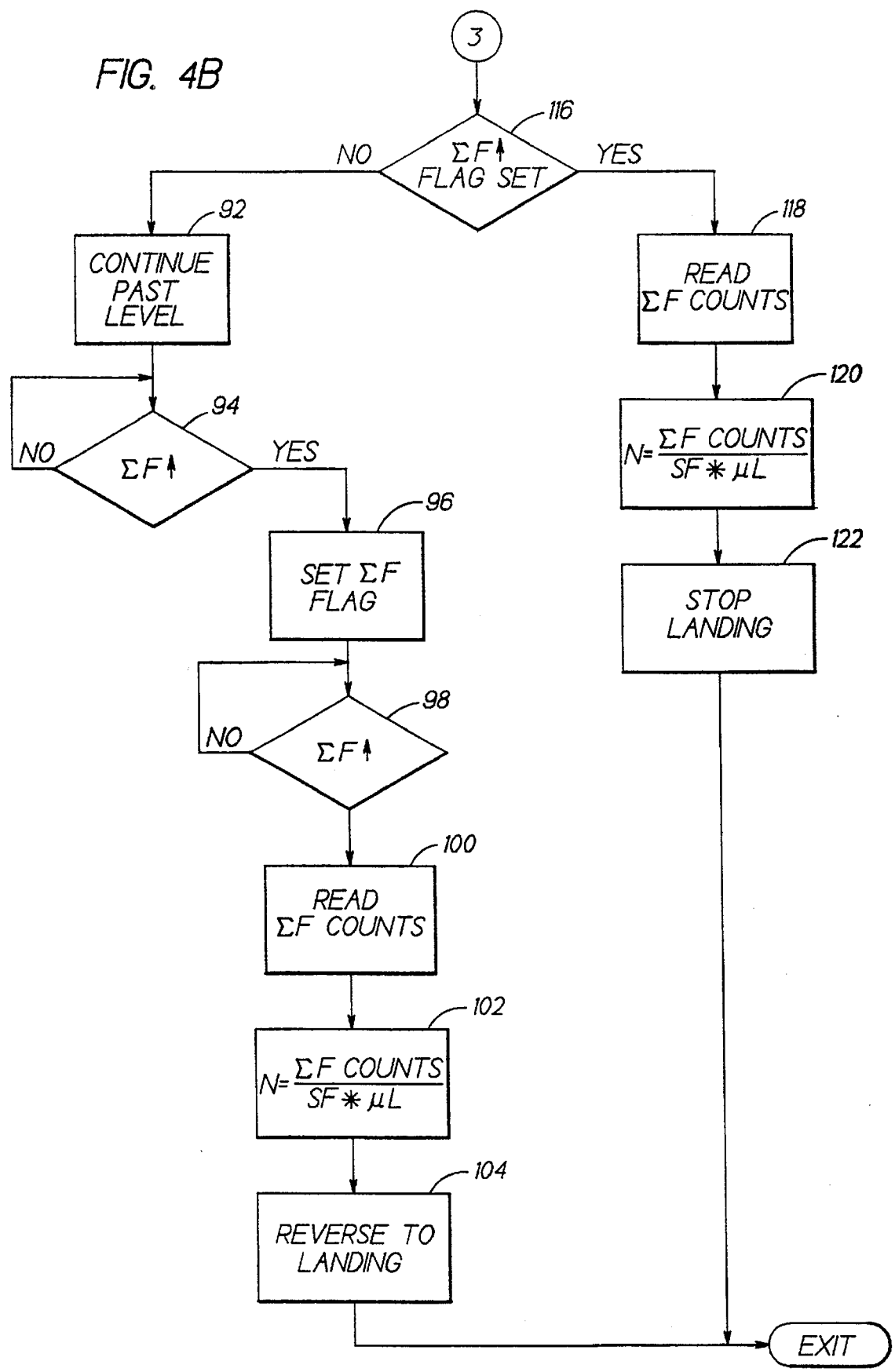
Figure 4C:
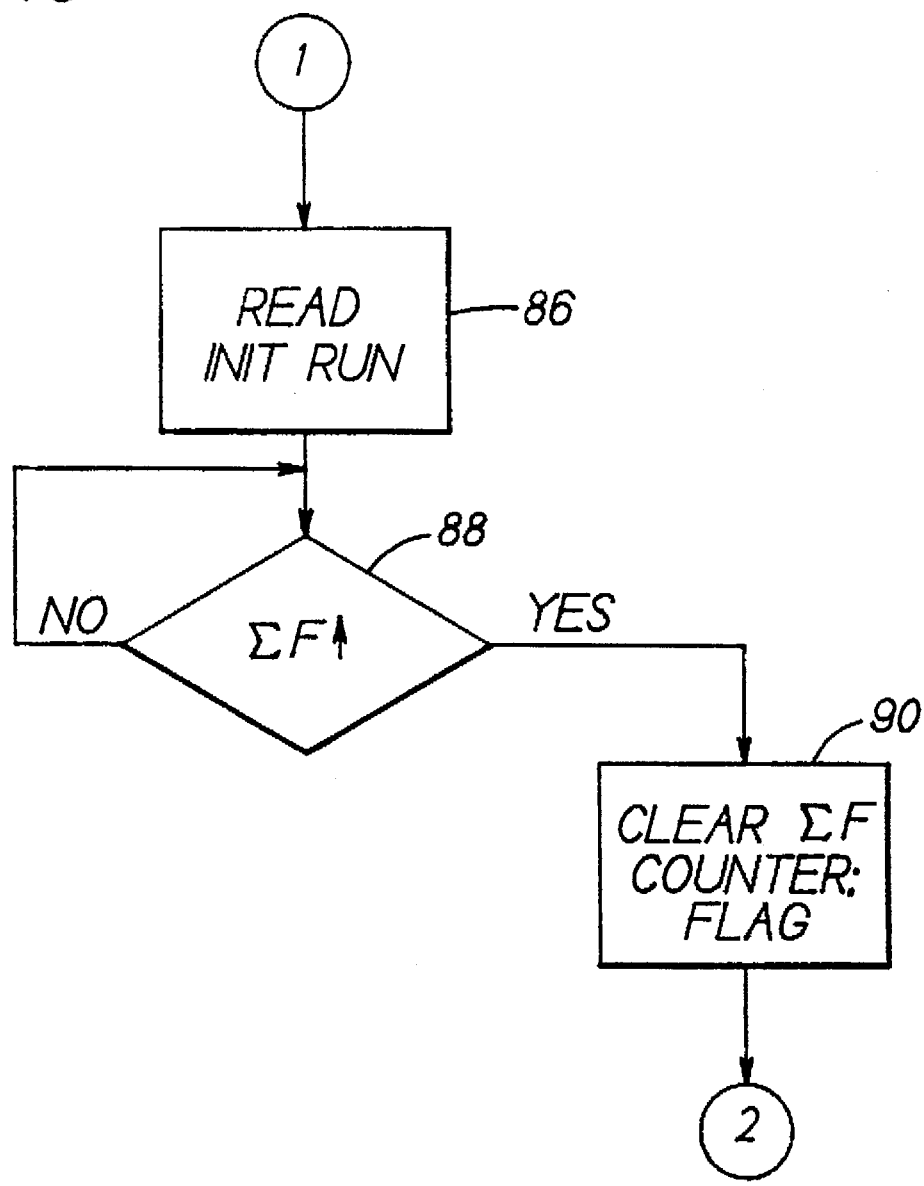

As shown in FIG. 4B, after the encoded floor counter 70 is cleared by a signal on line 77, the elevator car 14 continues moving, as indicated in the step 92, until encountering the encoded floor magnet 54b, which is sensed by the encoded floor sensor 64, as indicated at a step 94 and a signal is generated on line 87. The encoded floor flag in the microprocessor 72 is then set. The microprocessor 72 continues to sample the input from the encoded floor sensor 64, as indicated at step 98, until no further signal is received therefrom. Thereafter, the microprocessor 72 reads on line 79, as indicated at a step 100, the number of counts recorded by the encoded floor counter 70. The microprocessor 72 then calculates, as indicated at a step 102, the floor, or landing, number n. The direction of the elevator car 14 is then reversed, as indicated at a step 104, and the elevator car is brought to the landing n.

If, however, the elevator car 14 is below the encoded floor magnet 54b, upon execution of the step 108, then the elevator car 14 will travel one entire floor downwards and the encoded floor magnet 54a of the next lowest floor will be encountered before the microprocessor 72 receives an input on one of the lines, 81, 83, or 85 from the leveling up (LU), the leveling down (LD) or door zone (DZ) sensors, 58, 60, or 62 respectively. In this case, the encoded floor flag in the microprocessor 72 will be set, as indicated at a step 114. Thus, as the elevator car 14 begins to arrive at the next lower landing, the "YES" path in taken at the decision steps 112 and 116.

As shown in FIG. 4B, after the encoded floor magnet is passed, i.e., no further counts are received by the microprocessor 72, or after a predetermined amount of time has elapsed, the encoded floor count is read on line 79, as indicated at a step 118, from the encoded floor counter 70 and the floor number is computed, block 120, before the arrival, block 122, of the elevator car 14 at floor n.

In the case where one of the other sensors, 58, 60, or 62 becomes active, as indicated at a step 112, before the rising edge of the signal on line 87 from the encoded floor sensor 64, the elevator car 14 continues past the level and travels across the encoded floor magnet located on the other side of the door zone, as indicated at the step 92. The floor number is then calculated as described above with respect to steps 94, 96, 98, 100, 102, and 104, shown in FIG. 4B.

Although the present invention has been described with respect to one or more specific embodiments it will be understood that other arrangements and configurations can also be used that do not depart from the spirit and scope of the present invention. Hence, the present invention is deemed limited only by the appended claims and the reasonable interpretation thereof.

What is claimed is:

1. A system for position loss recovery for an elevator car; said system comprising:

signal generating means for generating signals indicative of the distance travelled by an elevator car within a hoistway;

floor location means, disposed within said hoistway, for indicating each floor location;

floor identifying means, disposed within said hoistway, for uniquely identifying each floor location, said floor identifying means including identification means having a length that is uniquely associated with a respective floor;

sensing means, affixed to said elevator car, for separately sensing said floor location means and said floor identifying means; and processing means for processing signals from said signal generating means and signals from said sensing means to determine an exact floor location of said elevator car.

2. The system as claimed in claim 1 wherein said identification means includes a plurality of pairs of encoded floor magnets disposed within said hoistway, each said pair of said plurality of pairs of encoded floor magnets having a length that is uniquely associated with a landing number of said respective floor with which said pair is associated for uniquely identifying each said floor.

3. The system as claimed in claim 2 wherein said length of each said pair of encoded floor magnets is related to said floor by the formula: $L=(n)(UL)$; wherein L is the length of each member of said pair of magnets; n is an integer representing said landing number; and UL is a predetermined unit length.

4. The system as claimed in claim 3 wherein said floor location means includes a plurality of door zone magnets, each said door zone magnet being associated with an elevator landing and precisely disposed along said hoistway with respect to said elevator landing.

5. The system as claimed in claim 4 wherein said system further comprises: a vertically extending tape.

6. The system as claimed in claim 5 wherein said plurality of door zone magnets are disposed along a first edge of said tape.

7. The system as claimed in claim 6 wherein said plurality of pairs of encoded floor magnets are disposed along a second edge of said tape.

8. The system as claimed in claim 7 wherein the members of each said pair of encoded floor magnets are disposed on opposite sides of one of said door zone magnets.

9. The system as claimed in claim 8 wherein said sensing means includes means for guiding said sensing means along said tape such that said tape is maintained at a predetermined position with respect to said sensing means.

10. The system as claimed in claim 9 wherein said sensing means includes; a leveling up sensor, a leveling down sensor, a door zone sensor, and an encoded floor sensor.

11. The system as claimed in claim 10 wherein said leveling up sensor, said leveling down sensor, said door zone sensor and said encoded floor sensor are Hall effect devices.

12. The system as claimed in claim 10 wherein said leveling up sensor, said leveling down sensor, and said door zone sensor are disposed proximate said first edge of said tape.

13. The system as claimed in claim 9 wherein said processing means includes an encoded floor counter for receiving pulses from said generating means and a microprocessor having a non-volatile memory associated therewith and accessible thereto.

14. The system as claimed in claim 13 wherein said encoded floor counter is gated by signals from said encoded floor sensor and said microprocessor receives the output from said encoded floor counter.

15. The system as claimed in claim 14 wherein said microprocessor receives inputs from said encoded floor sensor, said leveling up sensor, said leveling down sensor and said door zone sensor.

16. The system as claimed in claim 15 wherein said microprocessor includes a software program for calculating the floor number of said encoded floor magnets such that the position of said elevator car is known.

17. The system as claimed in claim 16 wherein said calculation is carried out in accordance with the formula: $n=(EFcounts)/(SF*UL)$; wherein EFcounts is the number of gated counts from said encoded floor counter; SF is a predetermined primary position counts/unit length scale factor and UL is the unit length of said encoded floor magnets.

18. A method for position loss recovery for an elevator car; said method comprising the steps of:

generating distance signals indicative of the distance travelled by an elevator car within a hoistway;

generating floor location signals indicative of each floor location;

generating floor identifying signals that uniquely identify each floor location by sensing the length of floor identification means disposed within said hoistway, each said floor identification means having a length that is uniquely associated with a respective floor;

separately sensing said floor location signals and said floor identifying signals; and processing said distance signals, floor location signals and said floor identifying signals to determine an exact floor location of said elevator car.

19. The method as claimed in claim 18 wherein said step of generating floor identifying signals includes the step of providing said floor identification means as a plurality of pairs of encoded floor magnets disposed within said hoistway, each said pair of said plurality of pairs of encoded floor magnets uniquely identifying each said floor.

20. The method as claimed in claim 19 wherein said step of processing includes the step of determining said length of said encoded floor magnets in accordance with the formula: $L=(n)(UL)$; wherein L is the length of each member of said pair of magnets; n is an integer representing said landing number; and UL is a predetermined unit length.

21. The method as claimed in claim 20 wherein said step of processing includes the step of calculating a floor number in accordance with the formula: $n=(EFcounts)/(SF*UL)$; wherein EF counts is a number of gated counts from an encoded floor counter and SF is a predetermined primary position counts/unit length scale factor.

* * * * *